(12) United States Patent
Tsai et al.

(10) Patent No.: US 11,703,723 B2
(45) Date of Patent: Jul. 18, 2023

(54) DISPLAY PANEL AND ELECTRONIC DEVICE

(71) Applicant: Innolux Corporation, Miao-Li County (TW)

(72) Inventors: Chia-Hao Tsai, Miao-Li County (TW); Ming-Jou Tai, Miao-Li County (TW); Youcheng Lu, Miao-Li County (TW); Wei-Yen Chiu, Miao-Li County (TW); Chih Lung Lin, Miao-Li County (TW); Yung-Hsun Wu, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 83 days.

(21) Appl. No.: 17/388,018

(22) Filed: Jul. 29, 2021

(65) Prior Publication Data

US 2022/0066271 A1 Mar. 3, 2022

(30) Foreign Application Priority Data

Aug. 28, 2020 (CN) .......................... 202010884773.6

(51) Int. Cl.
*G02F 1/1343* (2006.01)
*G02F 1/1333* (2006.01)

(52) U.S. Cl.
CPC .. *G02F 1/134372* (2021.01); *G02F 1/133345* (2013.01); *G02F 1/134363* (2013.01)

(58) Field of Classification Search
None
See application file for complete search history.

(56) References Cited

U.S. PATENT DOCUMENTS

2019/0094637 A1* 3/2019 Liu .................... G02F 1/134336
2020/0322467 A1* 10/2020 Huh ....................... G06F 1/1626

FOREIGN PATENT DOCUMENTS

CN 109188798 1/2019

* cited by examiner

*Primary Examiner* — Phu Vu
(74) *Attorney, Agent, or Firm* — JCIPRNET

(57) ABSTRACT

The disclosure provides a display panel, including a normal area and a functional area. The normal area includes a plurality of normal pixels, and each normal pixel has a normal pixel electrode and a normal common electrode. The normal pixel electrode and the normal common electrode are configured in a manner that each normal pixel has a first overlap ratio. The functional area includes a plurality of functional pixels, and each functional pixel has a functional pixel electrode and a functional common electrode. The functional pixel electrode and the functional common electrode are configured in a manner that each functional electrode has a second overlap ratio. The second overlap ratio of at least a part of the functional pixels is less than or equal to the first overlap ratio of at least a part of the normal pixels.

19 Claims, 8 Drawing Sheets

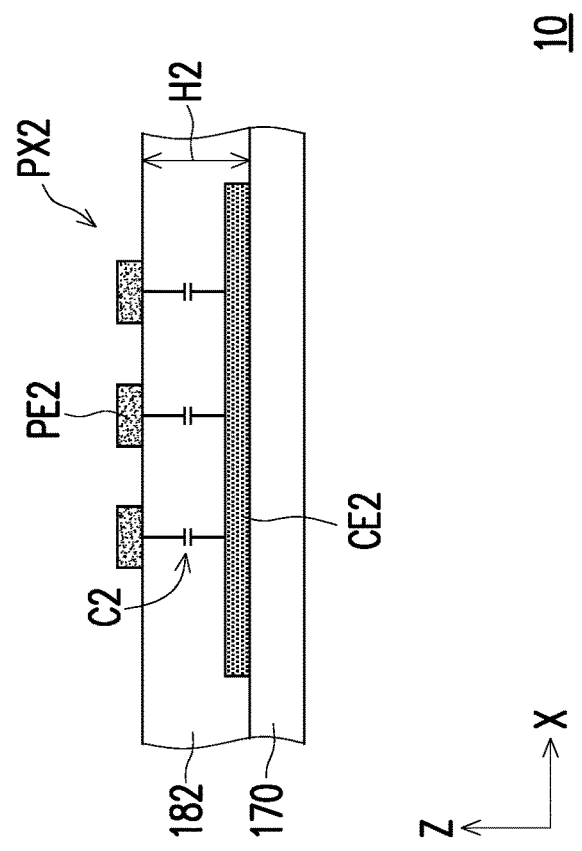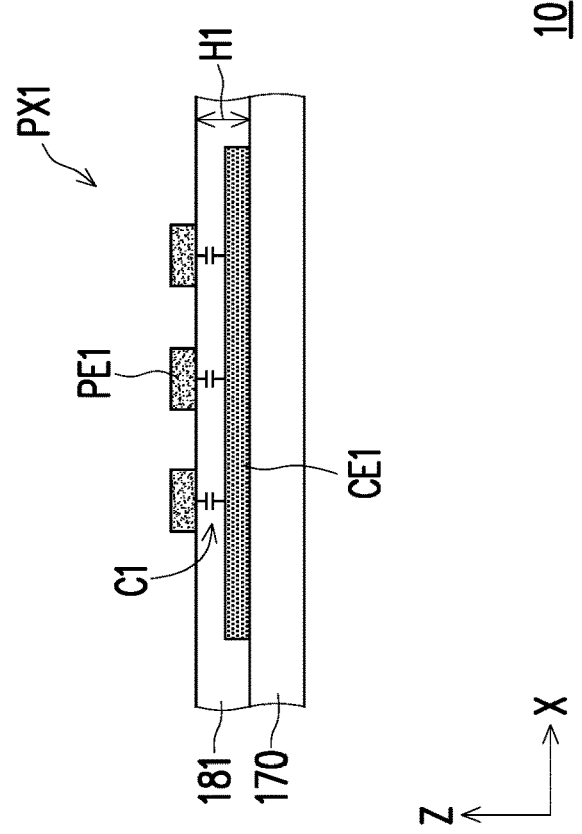

DISPLAY PANEL AND ELECTRONIC DEVICE

CROSS-REFERENCE TO RELATED APPLICATION

This application claims the priority benefit of China application serial no. 202010884773.6, filed on Aug. 28, 2020. The entirety of the above-mentioned patent application is hereby incorporated by reference herein and made a part of this specification.

BACKGROUND

Technical Field

The disclosure is directed to a display panel and an electronic device.

Description of Related Art

As applications of electronic devices have been continuously increased and expanded, development of display technologies is growing rapidly. With different application conditions, requirements for display quality of the electronic devices are increasing, and the electronic devices are facing different problems. Therefore, the research and development of the electronic devices should be continuously updated and adjusted.

SUMMARY

The disclosure provides a display panel that has good display quality.

The disclosure provides an electronic device that has good display quality.

According to an embodiment of the disclosure, a display panel includes a normal area and a functional area. The normal area includes a plurality of normal pixels, and each of the normal pixels has a normal pixel electrode and a normal common electrode. The normal pixel electrodes and the normal common electrodes are configured in a manner that each of the normal pixels has a first overlap ratio. The functional area includes a plurality of functional pixels, and each of the functional pixels has a functional pixel electrode and a functional common electrode. The functional pixel electrodes and the functional common electrodes are configured in a manner that each of the functional pixels has a second overlap ratio. The second overlap ratio of at least a part of the functional pixels is less than or equal to the first overlap ratio of at least a part of the normal pixels.

According to an embodiment of the disclosure, an electronic device includes a display panel and an optical sensing module. The optical sensing module is disposed corresponding to the functional area of the display panel.

In view of the above, in the display panel and the electronic device provided in one or more embodiments of the disclosure, the second overlap ratio of at least a part of the functional pixels may be less than or equal to the first overlap ratio of at least a part of the normal pixels. Thereby, a storage capacitance of the functional pixels in the functional area may be reduced to be less than or equal to a storage capacitance of the normal pixels in the normal area. As such, the pixel driving ability of the display panel or that of the electronic device may be improved. In addition, the display panel or the electronic device provided herein may have good display quality.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2A is a schematic partial enlarged cross-sectional view of normal pixels according to an embodiment of the disclosure.

FIG. 2B is a schematic partial enlarged cross-sectional view of functional pixels according to an embodiment of the disclosure.

DESCRIPTION OF THE EMBODIMENTS

Figure 1:
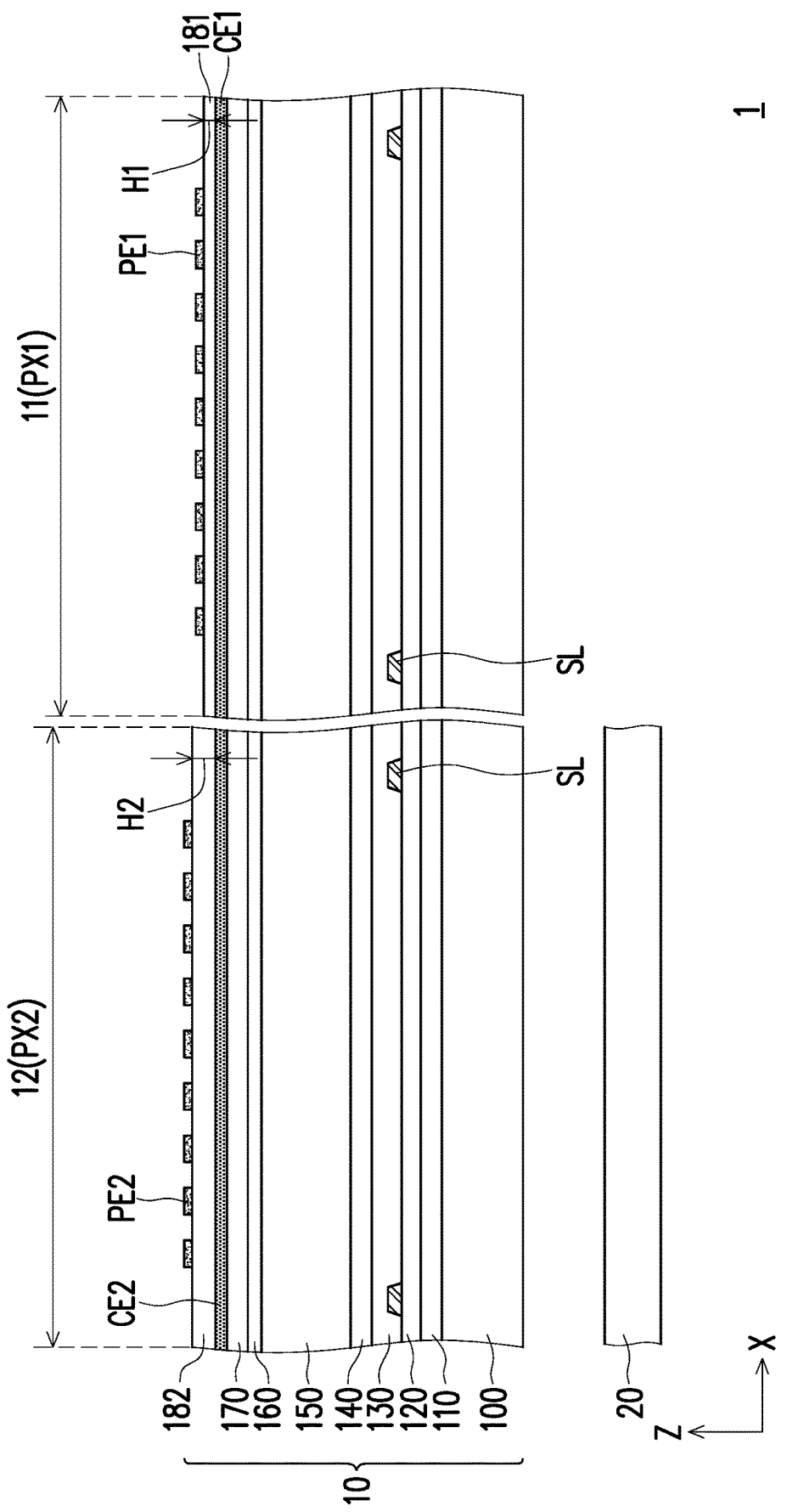
FIG. 1 is a schematic cross-sectional view of an electronic device according to an embodiment of the disclosure.

The disclosure may be understood with reference to the following detailed description and the accompanying drawings. It should be noted that, for ease of understanding by readers and concise drawings, a plurality of drawings in the disclosure merely show a part of an electronic device, and specific elements in the drawings are not drawn to scale. In addition, the quantity and size of the elements in the drawings are merely exemplary, and are not intended to limit the scope of the disclosure.

Some words are used to refer to specific elements in the whole specification and the appended claims in the disclosure. A person skilled in the art should understand that an electronic device manufacturer may use different names to refer to the same elements. The specification is not intended to distinguish elements that have the same functions but different names. In the specification and the claims, words such as "include", "comprise", and "have" are open words, and should be interpreted as "including, but not limited to". Therefore, when terms "include", "comprise", and/or "have" are used in the description of the disclosure, the presence of corresponding features, regions, steps, operations and/or components is specified without excluding the presence of one or more other features, regions, steps, operations and/or components.

The directional terms mentioned herein, like "above", "below", "front", "back", "left", and "right", refer to the directions in the accompanying drawings. Therefore, the directional terms are used for illustration instead of limiting the disclosure. In the accompanying drawings, common features of a method, a structure and/or a material used in a specific embodiment are shown in the drawings. However, these drawings should not be construed as defining or limiting the scope or nature of these embodiments. For example, the relative sizes, thicknesses and positions of films, regions and/or structures may be reduced or enlarged for clarity.

When a corresponding component (e.g., a film or a region) is referred to as being "disposed or formed on another component", it may be directly on the another component, or there may be other components between the two components. In another aspect, when a component is referred to as being "directly disposed or formed on another component", there is no component between the two components. In addition, when a component is referred to as being "disposed or formed on another component", the two components have an up and down relationship in a top view. The component may be located above or below the another component, and the up and down relationship depends on the orientation of the device.

It should be understood that, when a component or a film is referred to as being "connected to" another component or film, it may be directly connected to the another component or film, or there are components or films inserted between the two components or films. When a component or a film is referred to as being "directly connected to" another component or film, there is no component or film inserted between the two components or films. In addition, when a component is referred to as being "coupled to another component (or a variant thereof)", it may be directly connected to the another component, or may be indirectly connected to (e.g., electrically connected to) the another component through one or more components.

The terms "approximately", "equal to", "identical to" or "the same as", or "substantially" or "generally" are generally interpreted as within 20% of the given value or range, or interpreted as within 10%, 5%, 3%, 2%, 1%, or 0.5% of the given value or range.

Ordinal numbers used in the specification and the claims, like "first" and "second", are used to modify the elements, and do not imply or represent that the (or these) element(s) has (or have) any ordinal number, and do not indicate any order between an element and another element, or an order in a manufacturing method. These ordinal numbers are merely used to clearly distinguish an element having a name with another element having the same name. Different terms may be used in the claims and the specification, so that a first component in the specification may be a second component in the claims.

It should be noted that in the following embodiments, features in a plurality of embodiments may be replaced, recombined, or mixed to complete other embodiments without departing from the spirit of the disclosure. The features of the embodiments may be used in any combination without departing from the spirit of the disclosure or conflicting with each other.

In one or more embodiments of the disclosure, an electronic device may include a display device, an antenna device, a sensing device, a splicing device, or a transparent display apparatus, which should however not be construed as a limitation in the disclosure. The electronic device may be a rollable, stretchable, bendable, or flexible electronic device. The electronic device may, for instance, include liquid crystal, light-emitting diode (LED), quantum dot (QD), fluorescence, phosphor, other suitable materials (and the materials may be arbitrarily arranged and combined), other suitable display media, or a combination thereof; the LED may, for instance, include organic light-emitting diode (OLED), mini-LED, micro-LED, or QDLED (or QLED, for instance), which should not be construed as limitations in the disclosure. The antenna device may be, for instance, a liquid crystal antenna, which should however not be construed as a limitation in the disclosure. The splicing device may be, for instance, a display splicing device or an antenna splicing device, which should however not be construed as a limitation in the disclosure. Note that the electronic device may be any combination of the foregoing, which should however not be construed as a limitation in the disclosure. In addition, the electronic device may have a rectangular shape, a circular shape, a polygonal shape, a shape with curved edges, or any other appropriate shape. The electronic device may have peripheral systems, such as a driving system, a control system, a light source system, a rack system, and so on, so as to support the display device, the antenna device, or the splicing device. The content of the disclosure will be described below by applying semiconductor devices, which should however not be construed as a limitation in the disclosure.

In the disclosure, various embodiments described below may be combined and matched without departing from the spirit and the scope of the disclosure. For instance, some features provided in one embodiment may be combined with some features provided in another embodiment as still another embodiment.

Reference will now be made in detail to the exemplary embodiments of the disclosure, and examples of the exemplary embodiments are illustrated in the accompanying drawings. Whenever possible, the same reference numbers and symbols in the drawings and descriptions serve to represent the same or similar parts.

FIG. 1 is a schematic cross-sectional view of an electronic device according to an embodiment of the disclosure. FIG. 2A is a schematic partial enlarged cross-sectional view of normal pixels according to an embodiment of the disclosure. FIG. 2B is a schematic partial enlarged cross-sectional view of functional pixels according to an embodiment of the disclosure. For the clarity of the drawings and clear illustration, certain elements are omitted in FIG. 1, FIG. 2A, and FIG. 2B. With reference to FIG. 1, an electronic device 1 provided in the embodiment includes a display panel 10 and an optical sensing module 20. The optical sensing module 20 is disposed corresponding to a functional area 12 of the display panel 10. In this embodiment, the optical sensing module 20 includes an optical camera or an infrared (IR) sensor. In other embodiments, the optical sensing module 20 further includes a flashlight, an infrared (IR) light source, other sensors, electronic elements, or a combination of the above, which should however not be construed as a limitation in the disclosure. Under the above-mentioned configurations, the electronic device 1 may have a camera under display (CUD), a flashlight under display, soft light under display, IR light under display for a face recognition system, IR light under display for an iris recognition system, and soon, and the electronic device 1 may perform the above-mentioned functions, other functions, or a combination thereof, which should however not be construed as a limitation in the disclosure. In other embodiments, the electronic device 1 further includes a backlight module (not shown), which should however not be construed as a limitation in the disclosure. The electronic device 1 is taken as a display device as an example in the following description.

As shown in FIG. 1, the electronic device 1 includes the display panel 10. The display panel 10 includes a substrate 100, insulation layers 110, 120, 130, 140, 150, 160, 170, 181, and 182 stacked in sequence, an active device array, signal lines, and pixels, wherein the number of the insulation layers may be increased or decreased according to usage requirements. The display panel 10 includes a normal area 11 and a functional area 12, and a storage capacitance C2 of functional pixels PX2 in the functional area 12 may be less than or equal to a storage capacitance C1 of normal pixels PX1 in the normal area 11. Therefore, the pixel driving ability of the electronic device 1 or the display panel 10 may be improved. In addition, the electronic device 1 or the display panel 10 may have good display quality. Note that the display panel 10 provided in the embodiment may be a liquid crystal display (LCD) panel that drives liquid crystal molecules, a self-luminous light-emitting diode (LED) display panel, or a self-luminous organic light-emitting diode (OLED) display panel, which should however not be construed as a limitation in the disclosure.

With reference to FIG. 1, the display panel 10 includes the normal area 11 and the functional area 12. The functional area 12 may be an area defined anywhere in a display area. In detail, the functional area 12 is defined as an area which completely or partially overlaps the optical sensing module 20 in a normal direction (also referred to as the z-axis) perpendicular to the substrate 100 of the display panel 10. In other words, the optical sensing module 20 is correspondingly arranged in the functional area 12. The normal area 11 refers to a display area not occupied by the functional area 12. For clarity of drawings and clear illustration, FIG. 1 shows a normal pixel PX1 in the display area and a functional pixel PX2 in the functional area 12. However, the number of the pixels or the structural configuration thereof shown in FIG. 1 should not be construed as a limitation in the embodiment. In FIG. 1, the optical sensing module 20 is disposed on the outside of the display panel 10. In a feasible embodiment, the optical sensing module 20 may also be disposed in the display panel 10.

In this embodiment, according to different requirements, the substrate 100 may be a rigid substrate or a flexible substrate. A material of the substrate 100 includes, for instance, glass, quartz, ceramic, sapphire, plastic, or the like, which should however not be construed as a limitation in the disclosure. In another embodiment, the material of the substrate 100 may include an appropriate opaque material. In some embodiments, when the substrate 100 is a flexible substrate, it may include an appropriate flexible material, such as polycarbonate (PC), polyimide (PI), polypropylene (PP), polyethylene terephthalate (PET), other suitable materials, or a combination of the foregoing materials, which should not be construed as limitations in the disclosure. In addition, light transmittance of the substrate 100 is not limited; namely, the substrate 100 may be a transparent substrate, a semi-transparent substrate, or an opaque substrate.

In the normal direction (also referred to as the z-axis) perpendicular to the substrate 100, the insulation layers 110, 120, 130, 140, 150, 160, 170, 181, and 182 are sequentially disposed on a surface of the substrate 100. The insulation layers 110, 120, 130, 140, 150, 160, 170, 181, and 182 may have a single-layer or multi-layer structure and may include, for instance, an organic material (such as silicon nitride, etc.), an inorganic material, or a combination thereof, which should however not be construed as a limitation in the disclosure.

Figure 6:
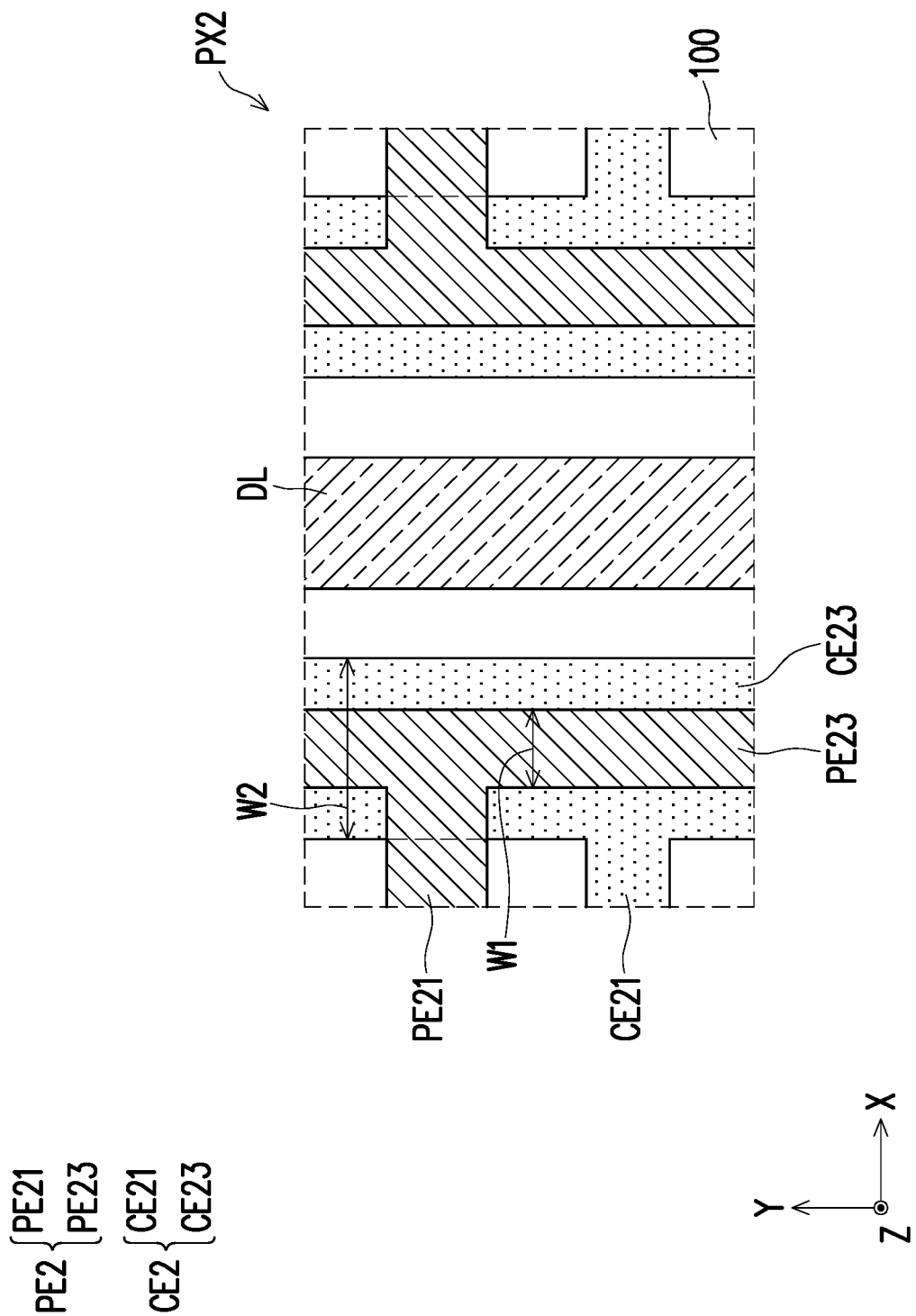
FIG. 6 is a schematic partial enlarged top view of functional pixels according to another embodiment of the disclosure.

Signal lines are disposed on the substrate 100 and may be located among the insulation layers. The signal lines include, for instance, scan lines SL and data lines DL (the data line DL is shown in FIG. 6), which should however not be construed as a limitation in the disclosure. In other embodiments, the signal lines also include a power line, a common electrode line, a touch line, or other lines, which should however not be construed as a limitation in the disclosure. As shown in FIG. 1, the scan lines SL are disposed on the insulation layer 120 and located in the normal area 11 and the functional area 12. In this embodiment, a material of the scan lines SL and the data lines DL may include a transparent conductive material or a non-transparent conductive material, such as indium tin oxide, indium zinc oxide, indium oxide, zinc oxide, tin oxide, a metallic material (such as aluminum, molybdenum, copper, argentum, etc.), other appropriate materials, or a combination thereof, which should however not be construed as a limitation in the disclosure.

Figure 7A:
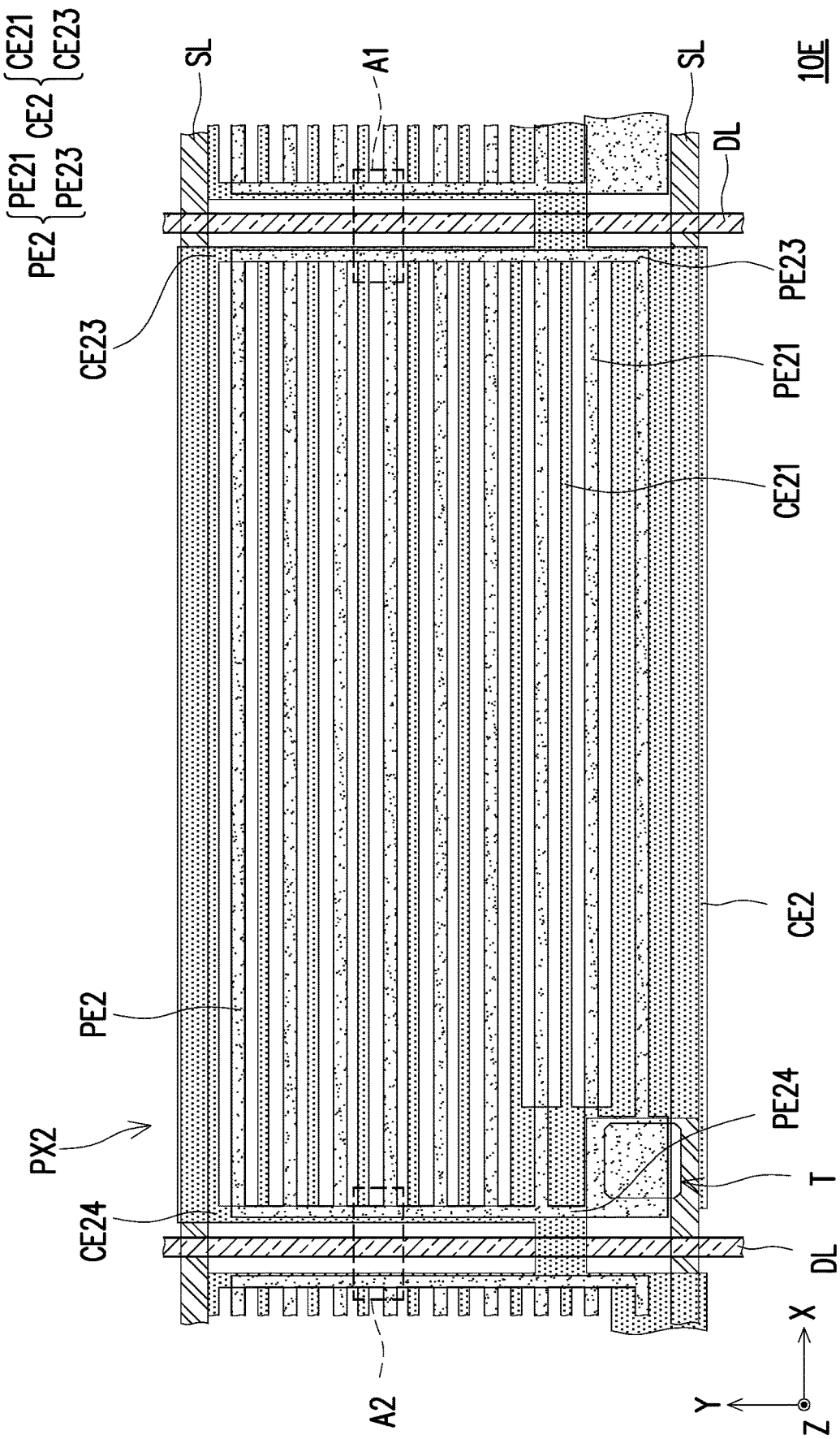
FIG. 7A is a schematic top view of functional pixels according to yet another embodiment of the disclosure.

In this embodiment, an active device array may be disposed on the substrate 100 and may be located among the insulation layers. The active device array may be electrically connected to the signal lines and coupled to the normal pixels PX1 or the functional pixels PX2. The active device array includes a plurality of active devices (an active device T is shown in FIG. 7A) arranged in an array. The active device is, for instance, a thin film transistor (TFT) having a semiconductor material. The semiconductor material includes, for instance, TFT made of amorphous silicon, low temperature poly-silicon (LTPS), metal oxide, or a combination thereof, which should however not be construed as a limitation in the disclosure. In some embodiments, different TFTs may have different semiconductor materials described above. In addition, the TFTs may, in response to actual requirements, include top gate transistors, bottom gate transistors, dual gate transistors, and double gate transistors, which should however not be construed as a limitation in the disclosure.

In this embodiment, the active device includes a semiconductor channel layer, a gate, and a source and a drain electrically connected to the semiconductor channel layer. In this embodiment, the gate may be electrically connected to the scan line SL, and the source may be electrically connected to the data line DL. A material of the gate may include molybdenum (Mo), titanium (Ti), tantalum (Ta), niobium (Nb), hafnium (Hf), nickel (Ni), chromium (Cr), cobalt (Co), zirconium (Zr), tungsten (W), aluminum (Al), copper (Cu), argentum (Ag), other suitable metal, or an alloy or a combination of the above materials, which should however not be construed as a limitation in the disclosure. Materials of the source and the drain may include a transparent conductive material or a non-transparent conductive material, such as indium tin oxide, indium zinc oxide, indium oxide, zinc oxide, tin oxide, a metallic material (such as aluminum, molybdenum, copper, argentum, etc.), other suitable materials, or a combination of the above, which should however not be construed as a limitation in the disclosure.

In this embodiment, the normal area 11 includes a plurality of normal pixels PX1 (one of which is schematically shown in FIG. 1). Each normal pixel PX1 has a normal pixel electrode PE1 and a normal common electrode CE1. The functional area 12 includes a plurality of functional pixels PX2 (one of which is schematically shown in FIG. 1). Each functional pixel PX2 has a functional pixel electrode PE2 and a functional common electrode CE2.

As shown in FIG. 1, the normal common electrode CE1 and the functional common electrode CE2 are disposed on the insulation layer 170 and are respectively located in the normal area 11 and the functional area 12. In the disclosure, the normal common electrode CE1 may be disposed or located in the normal area 11 in the normal direction of the substrate 100 (e.g., z-axis) and may at least overlap a part of the normal area 11, which should however not be construed as a limitation in the disclosure. In view of the above, it may be deduced that the functional common electrode CE2 may be disposed or located in the functional area 12 in the z-axis of the substrate 100 and may overlap at least a part of the functional area 12, which should however not be construed as a limitation in the disclosure. In other embodiments, other elements may also be located in other areas and thus will not be further described hereinafter. Under the above-mentioned configurations, the functional common electrode CE2 may overlap the optical sensing module 20.

In this embodiment, a material of the normal common electrode CE1 and the functional common electrode CE2 may include a transparent conductive material or a non-transparent conductive material, such as indium tin oxide, indium zinc oxide, indium oxide, zinc oxide, tin oxide, a metallic material (e.g., aluminum, molybdenum, copper, argentum, etc.), other suitable materials, or a combination thereof, which should however not be construed as a limitation in the disclosure.

In this embodiment, in the normal area 11, the insulation layer 181 is disposed on the normal common electrode CE1. In the functional area 12, the insulation layer 182 is disposed on the functional common electrode CE2. In this embodiment, the normal pixel electrode PE1 and the normal common electrode CE1 may be located in different layers. For instance, in the normal area 11, the normal pixel electrode PE1 is disposed on the normal common electrode CE1, and the normal pixel electrode PE1 partially overlaps the normal common electrode CE1. In this embodiment, the functional pixel electrode PE2 and the functional common electrode CE2 are located in different layers. For instance, in the functional area 12, the functional pixel electrode PE2 is disposed on the functional common electrode CE2, and the functional pixel electrode PE2 partially overlaps the functional common electrode CE2. Under the above-mentioned configurations, the functional pixel electrode PE2 may at least partially overlap the optical sensing module 20. Thereby, an electric field may be generated between the pixel electrode and the common electrode to drive a display medium, and a storage capacitance may be generated between the pixel electrode and the common electrode, which should however not be construed as a limitation in the disclosure. The display panel 10 provided in this embodiment is not limited to the LCD panel and may also include the LED display panel or the OLED display panel, which should not be construed as a limitation in the disclosure.

With reference to FIG. 2A, in the normal area 11, the normal pixel electrode PE1 and the normal common electrode CE1 are configured in a matter that each normal pixel PX1 has a first overlap ratio R1. The first overlap ratio R1 may be a ratio of an overlapping area of the normal pixel electrode PE1 and the normal common electrode CE1 to an area occupied by the normal common electrode CE1 as shown in a projection on the normal direction (also referred to as the z-axis) of the substrate 100 of the display panel 10; namely, (the overlapping area of the normal pixel electrode PE1 and the normal common electrode CE1)/(the area occupied by the normal common electrode CE1).

With reference to FIG. 2B, in the functional area 12, the functional pixel electrode PE2 and the functional common electrode CE2 are configured in a matter that each functional pixel PX2 has a second overlap ratio R2. The second overlap ratio R2 may be a ratio of an overlapping area of the functional pixel electrode PE2 and the functional common electrode CE2 to an area occupied by the functional common electrode CE2 as shown in a projection on the normal direction (also referred to as the z-axis) of the substrate 100 of the display panel 10; namely, (the overlapping area of the functional pixel electrode PE2 and the functional common electrode CE2)/(the area occupied by the functional common electrode CE2).

In order to improve the sensing sensitivity and achieve good visual effects of the optical sensing module 20 in the functional area 12, an area occupied by the functional pixels PX2 in the functional area 12 is increased. For instance, in the normal direction (also referred to as the z-axis) of the substrate 100 of the display panel 10, the area occupied by any of the functional pixels PX2 is larger than the area occupied by any of the normal pixels PX1. Therefore, the storage capacitance C2 of the functional pixels PX2 is increased. As such, in the electronic device 1 or the display panel 10 provided in the disclosure, the storage capacitance C2 of the functional pixels PX2 in the functional area 12 may be adjusted by reducing the second overlap ratio R2 of at least a part of the functional pixels PX2 to be less than or equal to the first overlap ratio R1 of the at least a part of the normal pixels PX1. Thereby, the storage capacitance C2 of the functional pixels PX2 in the functional area 12 may be reduced to be less than or equal to the storage capacitance C1 of the normal pixels PX1 in the normal area 11. Hence, the pixel driving ability of the electronic device 1 or the display panel 10 may be improved. In addition, the electronic device 1 or the display panel 10 may have an improved overall transmittance and good display quality.

Specifically, please refer to FIG. 1, FIG. 2A and FIG. 2B. In this embodiment, the second overlap ratio R2 may be equal to the first overlap ratio R1. However, in this embodiment, plural photomasks may be used to perform the manufacturing process, so that a thickness H2 of the insulation layer 182 in the functional area 12 is greater than a thickness H1 of the insulation layer 181 in the normal area 11. In this embodiment, the thickness of the insulation layer may be the maximum vertical distance from a top surface to a bottom surface of the insulation layer in the z-axis of the substrate 100. Under the above-mentioned configurations, as compared to the normal pixels PX1, a distance from the functional pixel electrodes PE2 to the functional common electrodes CE2 of the functional pixels PX2 may be greater than a distance from the normal pixel electrodes PE1 to the normal common electrodes CE1 of the normal pixels PX1.

According to the capacitance formula $C=\varepsilon_0\varepsilon_r A/d$, since the distance between the functional pixel electrodes PE2 and the functional common electrodes CE2 of the functional pixels PX2 may be greater than the distance between the normal pixel electrodes PE1 and the normal common electrodes CE1 of the normal pixels PX1, the storage capacitance C2 of the functional pixels PX2 may be less than the storage capacitance C1 of the normal pixels PX1. In this embodiment, C is the capacitance, $\varepsilon 0$ is the vacuum permittivity, $\varepsilon r$ is the relative permittivity, A is the area, and d is the distance. As a result, the storage capacitance C2 of the functional pixels PX2 in the functional area 12 is reduced to be less than or equal to the storage capacitance C1 of the normal pixels PX1 in the normal area 11. Hence, the pixel driving ability of the electronic device 1 or the display panel 10 may be improved. In addition, the electronic device 1 or the display panel 10 may have good display quality.

In other embodiments, in the normal area 11, the normal pixel electrode PE1 may be disposed between the insulation layer 170 and the insulation layer 181, and the normal common electrode CE1 may be disposed on the insulation layer 181. In the functional area 12, the functional pixel electrode PE2 may be disposed between the insulation layer 170 and the insulation layer 182, and the functional common electrode CE2 may be disposed on the insulation layer 182, which should however not be construed as a limitation in the disclosure. That is to say, the display panel 10 in the disclosure may have a structure of the pixel electrode on top or the common electrode on top according to an embodiment, which should however not be construed as a limitation shown in FIG. 1, FIG. 2A, or FIG. 2B.

According to an embodiment of the disclosure, in the electronic device 1 or the display panel 10, the second overlap ratio R2 of at least a part of the functional pixels PX2 may be less than or equal to the first overlap ratio R1 of at least a part of the normal pixels PX1. Alternatively, due to the thickness of the insulation layer, the distance between the functional pixel electrodes PE2 and the functional common electrodes CE2 of the functional pixels PX2 may be greater than the distance between the normal pixel electrodes PE1 and the normal common electrodes CE1 of the normal pixels PX1. Therefore, under the above-mentioned configurations, the storage capacitance C2 of the functional pixels PX2 in the functional area 12 is reduced to be less than or equal to the storage capacitance C1 of the normal pixels PX1 in the normal area 11. As such, the pixel driving ability of the electronic device 1 or the display panel 10 to may be improved. In addition, the electronic device 1 or the display panel 10 may have the improved overall transmittance and good display quality.

Other embodiments are provided below for description. Note that the reference numbers and part of the content of the foregoing embodiments are used in the following embodiments, wherein the same reference numbers serve to represent the same or similar elements, and the description of the same technical content is omitted. The description of the omitted parts may be found in the foregoing embodiments and will not be repeated in the following embodiments.

Figure 3B:
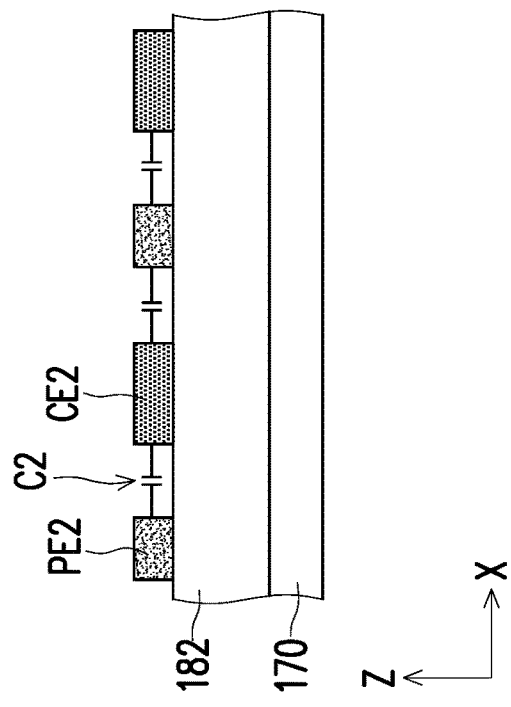
FIG. 3B is a schematic partial enlarged cross-sectional view of functional pixels according to another embodiment of the disclosure.
Figure 3A:
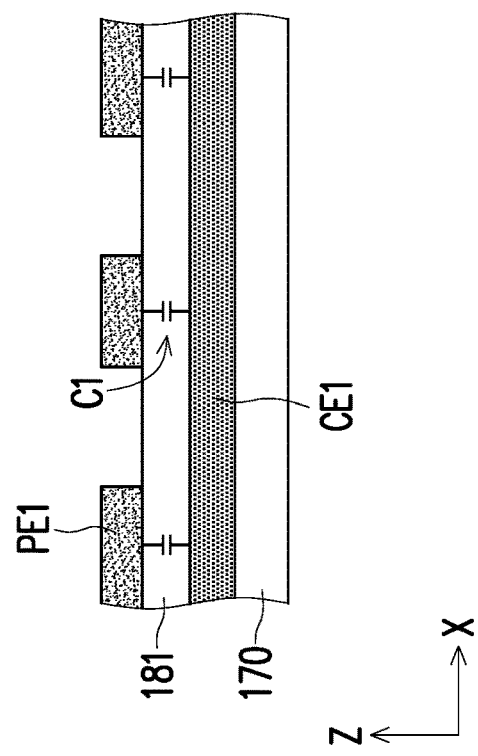
FIG. 3A is a schematic partial enlarged cross-sectional view of normal pixels according to another embodiment of the disclosure.

FIG. 3A is a schematic partial enlarged cross-sectional view of normal pixels according to another embodiment of the disclosure. FIG. 3B is a schematic partial enlarged cross-sectional view of functional pixels according to another embodiment of the disclosure. For clarity of the drawings and clear illustration, certain elements are omitted in FIG. 3A and FIG. 3B. The display panel 10A provided in this embodiment may be substantially similar to the display panel 10 depicted in FIG. 2A and FIG. 2B, so the same and similar components in the two embodiments are not repeated hereinafter. That is, the normal pixel electrode PE1 overlaps the normal common electrode CE1 in the z-axis. For instance, in the normal area 11, a fringe field switching (FFS) technology is applied to drive the display medium.

In the functional area 12 of the display panel 10A, the functional pixel electrode PE2 and the functional common electrode CE2 are located in the same layer. That is, the functional pixel electrode PE2 and the functional common electrode CE2 are located in the insulation layer 182 and are adjacently disposed in an interlaced manner, or the functional pixel electrode PE2 and the functional common electrode CE2 are located on the same horizontal plane. From another perspective, the functional pixel electrode PE2 does not overlap functional common electrode CE2 in the z-axis. For instance, in the functional area 12, an in-plane switching (IPS) technology is applied to drive the display medium.

In this embodiment, the first overlap ratio R1 is the same as what is described above and thus will not be further described. The second overlap ratio R2 may be a ratio of an overlapping area of the functional pixel electrode PE2 and the functional common electrode CE2 to an area occupied by the functional common electrode in the z-axis as shown in a projection on an x-axis (perpendicular to the z-axis or perpendicular to the normal direction of the substrate 100); namely, (the overlapping area of the functional pixel electrode PE2 and the functional common electrode CE2)/(the area occupied by the functional common electrode CE2 along the z-axis). Under the above-mentioned configurations, since the overlapping area of the functional pixel electrode PE2 and the functional common electrode CE2 may depend on the thickness of the functional pixel electrode PE2 and the functional common electrode CE2, the overlapping area may be further reduced, and the second overlap ratio R2 may be reduced.

The second overlap ratio R2 of the functional area 12 applying the IPS technology may be less than the first overlap ratio R1 of the normal area 11 applying the FFS technology, the storage capacitance C2 of the functional pixels PX2 in the functional area 12 is reduced to be less than or equal to the storage capacitance C1 of the normal pixels PX1 in the normal area 11. Therefore, the pixel driving ability of the display panel 10A may be improved. In addition, the display panel 10A may have good display quality. The display panel 10A may further achieve good technical effects similar to those accomplished in the previous embodiment.

Figure 4:
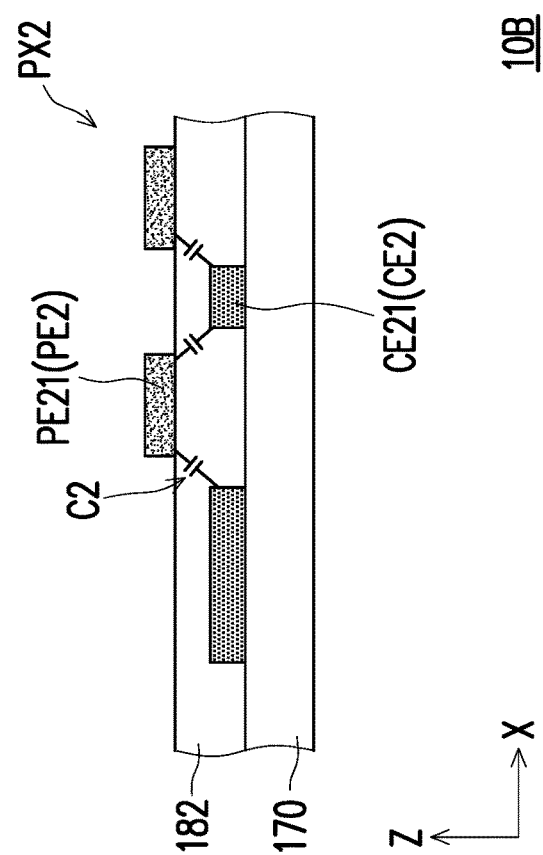
FIG. 4 is a schematic partial enlarged cross-sectional view of functional pixels according to another embodiment of the disclosure.

FIG. 4 is a schematic partial enlarged cross-sectional view of functional pixels according to another embodiment of the disclosure. For clarity of the drawings and clear illustration, certain elements are omitted in FIG. 4. The display panel 10B provided in this embodiment may be substantially similar to the display panel 10 depicted in FIG. 2B, so the same and similar components in the two embodiments are not repeated hereinafter. In this embodiment, in the functional pixels PX2, the functional pixel electrode PE2 and the functional common electrode CE2 are located in different layers. Along the z-axis, finger portions PE21 of the functional pixel electrodes PE2 are located on the outside of finger portions CE21 of the functional common electrodes CE2. That is, along the z-axis, the finger portions PE21 of the functional pixel electrodes PE2 do not overlap the finger portions CE21 of the functional common electrodes CE2. As such, the overlapping area of the functional pixel electrodes PE2 and the functional common electrodes CE2 may be further reduced, so as to reduce the second overlap ratio R2. Thereby, the storage capacitance C2 of the functional pixels PX2 may be reduced. Hence, the pixel driving ability of the display panel 10B may be improved. In addition, the display panel 10B may have good display quality. The display panel 10B may further achieve good technical effects similar to those accomplished in the previous embodiment.

Figure 5:
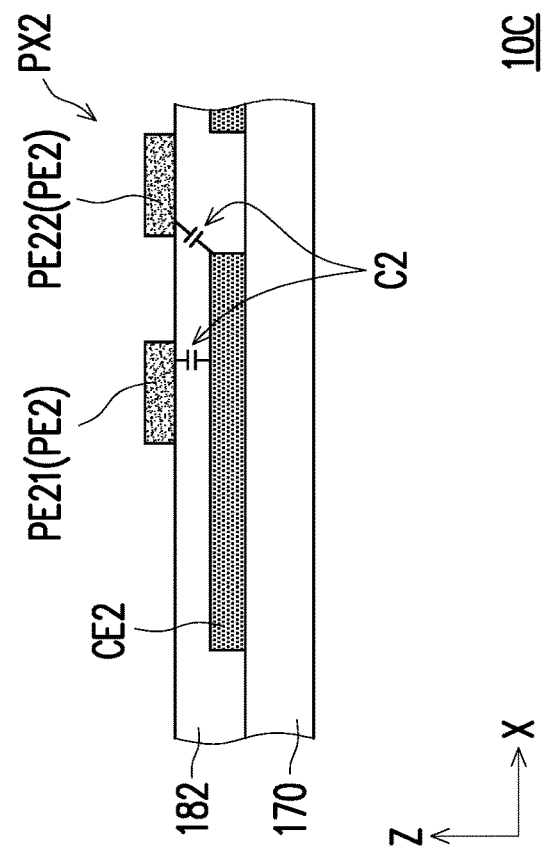
FIG. 5 is a schematic partial enlarged cross-sectional view of functional pixels according to another embodiment of the disclosure.

FIG. 5 is a schematic partial enlarged cross-sectional view of functional pixels according to another embodiment of the disclosure. For clarity of the drawings and clear illustration, certain elements are omitted in FIG. 5. The display panel 10C provided in this embodiment may be substantially similar to the display panel 10B depicted in FIG. 4, so the same and similar components in the two embodiments are not repeated hereinafter. In this embodiment, the functional pixel electrode PE2 partially overlaps the functional common electrode CE2. For instance, in the functional pixels PX2, the functional pixel electrodes PE2 and the functional common electrodes CE2 are located in different layers. Along the z-axis, the finger portions PE21 of the functional pixel electrodes PE2 overlap the functional common electrodes CE2 (or the finger portions thereof, which should however not be construed as a limitation in the disclosure). In addition, the functional pixel electrodes PE2 further include finger portions PE22, and the finger portions PE22 are located outside the functional common electrodes CE2. That is, along the z-axis, the portions PE22 do not overlap the functional common electrodes CE2 (or the finger portions thereof, which should however not be construed as a limitation in the disclosure). Thereby, an overlapping area of the functional pixel electrodes PE2 and the functional common electrodes CE2 may be adjusted, i.e., the effect of adjusting the second overlap ratio R2 may be achieved. As such, the display panel 10C may strike a balance between reducing the storage capacitance C2 of the functional pixels PX2 or maintaining the effective storage capacitance C2. Accordingly, the pixel driving ability of the display panel 10C may be improved. In addition, the display panel 10C may have good display quality, and the display panel 10C may achieve favorable technical effects similar to the those accomplished in the previous embodiments.

FIG. 6 is a schematic partial enlarged top view of functional pixels according to another embodiment of the disclosure. For clarity of the drawings and clear illustration, certain elements are omitted in FIG. 6. The same and similar components in the display panel 10D provided in this embodiment and provided in the previous embodiments are not further described hereinafter. The functional pixel electrodes PE2 of the functional pixels PX2 provided in the embodiment have finger portions PE21 extending along the x-axis and connection portions PE23 connecting the finger portions PE21. The connection portions PE23 extend along the y-axis. The connection portions PE23 extend along the y-axis. The display panel 10D includes data lines DL extending along the y-axis, and the data lines DL are arranged in parallel with the connection portions PE23 or connection portions CE23. In this embodiment, the x-axis is perpendicular to the y-axis, and the y-axis is perpendicular to the z-axis.

The functional common electrodes CE2 have the finger portions CE21 extending along the x-axis and the connection portions CE23 connecting the finger portions CE21. The connection portions CE23 extend along the y-axis. In this embodiment, the finger portions CE21 of the functional common electrodes CE2 and the finger portions PE21 of the functional pixel electrodes PE2 are alternately arranged along the y-axis and do not overlap along the z-axis. Thereby, the storage capacitance of the functional pixels PX2 may be reduced.

In this embodiment, the connection portions PE23 of the functional pixel electrodes PE2 may overlap the connection portions CE23 of the functional common electrodes CE2 along the z-axis. In detail, along the z-axis, the connection portions PE23 may be located in the connection portions CE23. The connection portions PE23 may have a width W1. The connection portions CE23 may have a width W2. In this embodiment, the width may be the maximum straight-line distance between two opposite sides of the connection portions along the x-axis.

The width W2 of the connection portions CE23 provided in this embodiment may be greater than the width W1 of the connection portions PE23, which should however not be construed as a limitation in the disclosure. In other embodiments, the width W1 of the connection portions PE23 may be greater than the width W2 of the connection portions CE23. That is, the widths of the connection portions of the two layers of electrodes are different from each other and have a width difference. In addition, edges of the connection portions PE23 and the connection portions CE23 do not overlap. As exemplarily shown in FIG. 6, there may be a width difference between the right edges of the connection portions PE23 and the right edges of the connection portions CE23, or there may be a width difference between the left edges of the connection portions PE23 and the left edges of the connection portions CE23, which should however not be construed as limitations in the disclosure.

In this embodiment, the value of the width difference between the connection portions PE23 and the connection portions CE23 may be 0 μm<the width difference≤20 μm, which should however not be construed as a limitation in the disclosure. In other embodiments, the value of the width difference between the connection portions PE23 and the connection portions CE23 may be 0 μm<the width difference≤10 μm. For instance, the connection portions PE23 may be located in the connection portions CE23, and the distance between the right edges of the connection portions PE23 and the right edges of the connection portions CE23 is 1 μm, 5 μm, 10 μm, 15 μm, or 20 μm. In this embodiment, the value of the width difference between the connection portions PE23 and the connection portions CE23 may be 0 μm<the width difference≤20 μm, which should however not be construed as a limitation in the disclosure. Alternatively, the connection portions CE23 may be located in the connection portions PE23, and the distance between the left edges of the connection portions CE23 and the left edges of the connection portions PE23 is 1 μm, 5 μm, 10 μm, 15 μm, or 20 μm. In this embodiment, the value of the width difference between the connection portions PE23 and the connection portions CE23 may be 0 μm<the width difference≤20 μm, which should however not be construed as a limitation in the disclosure. Note that the descriptions provided above are illustrative examples and are not intended to limit the numeral range provided in the embodiments of the disclosure. When there is any deviation or tolerance in the manufacturing process, the above-mentioned configurations may lessen the impact on the overlapping area of the functional pixel electrodes PE2 and the functional common electrodes CE2, so as to keep the overlap ratio expected by the user.

Thereby, the overlapping area of the functional pixel electrodes PE2 and the functional common electrodes CE2 may be adjusted, i.e., the effect of adjusting the second overlap ratio R2 may be achieved. As such, the storage capacitance C2 of the functional pixels PX2 may be reduced. Besides, when there is any deviation or tolerance in the manufacturing process, the display panel 10D may ensure the overlap ratio of the functional pixel electrodes PE2 and the functional common electrodes CE2 to be kept as expected. Therefore, the pixel driving ability of the display panel 10D may be improved. In addition, the display panel 10D may have good display quality, and the display panel 10D may achieve favorable technical effects similar to the those accomplished in the previous embodiments.

Figure 7B:
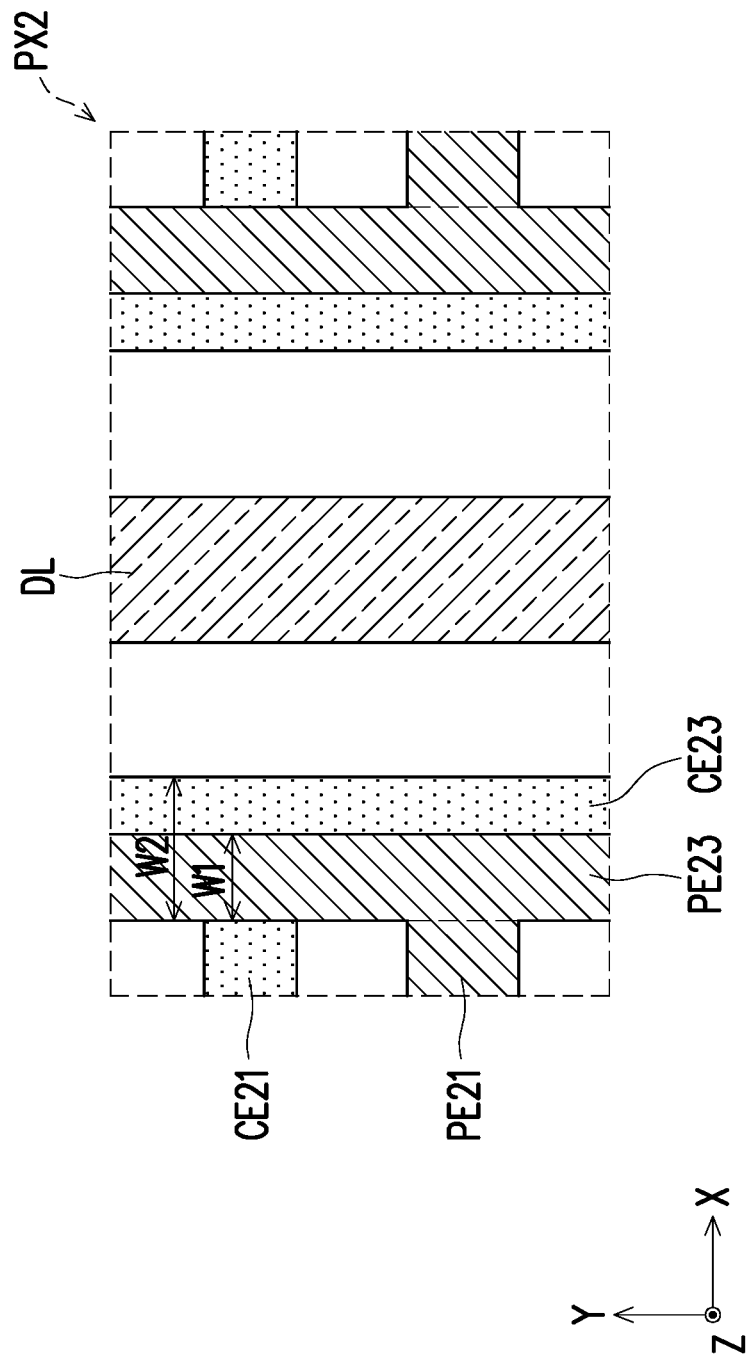
FIG. 7B is a schematic partial enlarged top view of the area A1 depicted in FIG. 7A.
Figure 7C:
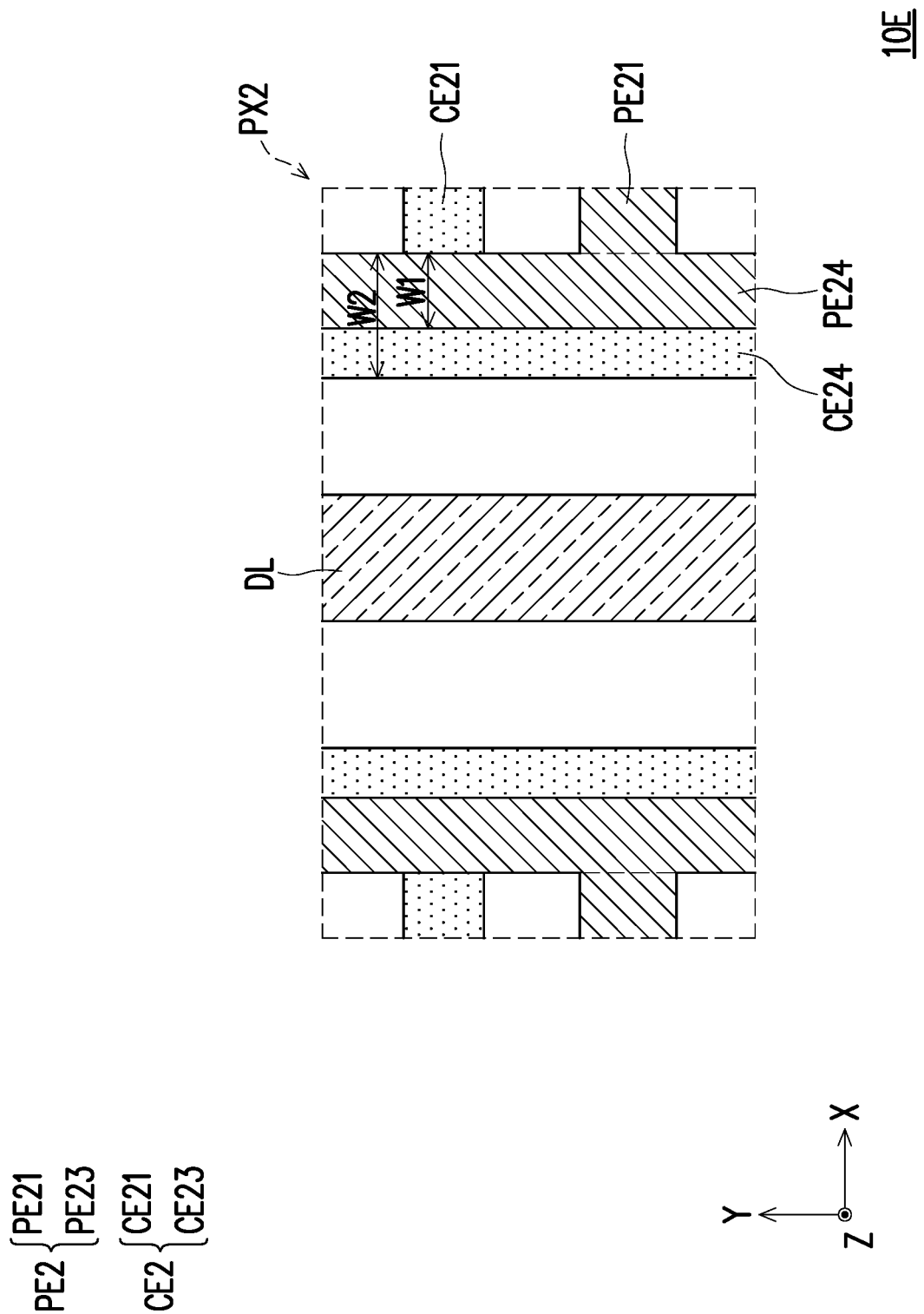
FIG. 7C is a schematic partial enlarged top view of the area A2 depicted in FIG. 7A.

FIG. 7A is a schematic top view of functional pixels according to yet another embodiment of the disclosure. FIG. 7B is a schematic partial enlarged top view of the area A1 depicted in FIG. 7A. FIG. 7C is a schematic partial enlarged top view of the area A2 depicted in FIG. 7A. For clarity of the drawings and clear illustration, certain elements are omitted in FIG. 7A, FIG. 7B, and FIG. 7C. The display panel 10E provided in this embodiment may be substantially similar to the display panel 10D depicted in FIG. 6, so the same and similar components in the two embodiments are not repeated hereinafter. In this embodiment, one of the two opposite edges of the connection portions PE23 is overlapped with or aligned to one of the two opposite edges of the connection portions CE23, or one of the two opposite edges of the connection portions PE24 is overlapped with or aligned to one of the two opposite edges of the connection portions CE24, while the other edges are not overlapped. In detail, the functional pixel PX2 is located between two data lines DL extending along the y-axis and located between two scan lines SL extending along the x-axis. The active device T is electrically connected to the scan line SL or the data line DL and is coupled to the functional pixel electrode PE2. In this embodiment, the functional pixel electrode PE2 includes a plurality of finger portions PE21 and connection portions PE23 and PE24 connecting the finger portions PE21 at opposite ends of the finger portions PE21. The functional common electrode CE2 includes a plurality of finger portions CE21 and connection portions CE23 and CE24 connecting the finger portions CE21 at opposite ends of the finger portions CE21. In this embodiment, the finger portions CE21 of the functional common electrode CE2 and the finger portions PE21 of the functional pixel electrode PE2 are alternately arranged along the y-axis and are not overlapped along the z-axis. Besides, around the scan lines SL, the finger portions PE21 of the functional pixel electrode PE2 overlap the functional common electrode CE2. Thereby, the display panel 10E may strike a balance between reducing the storage capacitance C2 of the functional pixels PX2 or maintaining the effective storage capacitance C2.

Please refer to the schematic enlarged views of the area A1 depicted in FIG. 7B and the area A2 depicted in FIG. 7C. In this embodiment, the connection portions PE23 (or the connection portions PE24) of the functional pixel electrodes PE2 are located in the connection portions CE23 (or the connection portions CE24) of the functional common electrodes CE2, and the width W1 of the connection portions PE23 (or the connection portions PE24) is less than the width W2 of the connection portions CE23 (or the connection portions CE24). In other embodiments, the connection portions CE23 (or the connection portions CE24) may also be located in the connection portions PE23 (or the connection portions PE24). The descriptions of the width of the connection portions and the width differences may be deduced from the descriptions above and therefore will not be further provided hereinafter.

As shown in FIG. 7B, the left edges of the connection portions PE23 may overlap the left edges of the connection portions CE23, and there may be a width difference between the right edges of the connection portions PE23 and the right edges of the connection portions CE23. As shown in FIG. 7C, the right edges of the connection portions PE24 may overlap the right edges of the connection portions CE24, and there may be a width difference between the left edges of the connection portions PE24 and the left edges of the connection portions CE24. In this embodiment, the value of the width difference may be 0 μm<the width difference≤20 μm, which should however not be construed as a limitation in the disclosure. In other embodiments, the value of the width difference between the connection portions PE23 and the connection portions CE23 may be 0 μm<the width difference≤10 μm.

Under the above-mentioned configurations, when there is a rightward deviation in the manufacturing process, the connection portions PE23 may move toward the right of FIG. 7B, so that the finger portions PE21 overlap the connection portions CE23. In other words, the overlap ratio of the functional pixel electrodes PE2 and the functional common electrodes CE2 may be increased. The connection portions PE24 in FIG. 7C may be moved toward the right, so that the connection portions PE24 do not overlap the connection portions CE24. Under the above-mentioned configurations, the width difference between the connection portions PE24 and the connection portions CE24 may be increased, or the overlapping portions may be reduced. From another perspective, the overlap ratio of the functional pixel electrodes PE2 and the functional common electrodes CE2 may be reduced. Thereby, the impact of the deviation or tolerance generated in the manufacturing process on the overlap ratio of the functional pixel electrodes PE2 and the functional common electrodes CE2 may be reduced. The display panel 10E may ensure the overlap ratio of the functional pixel electrodes PE2 and the functional common electrodes CE2 to be kept as expected. Accordingly, the pixel driving ability of the display panel 10E may be improved. In addition, the display panel 10E may have good display quality, and the display panel 10E may achieve favorable technical effects similar to the those accomplished in the previous embodiments.

To sum up, in the display panel and the electronic device provided in one or more embodiments of the disclosure, since the area occupied by the functional pixels is larger than the area occupied by the normal pixels, the second overlap ratio of at least a part of the functional pixels may be less than or equal to the first overlap ratio of at least a part of the normal pixels. Thereby, the storage capacitance of the functional pixels in the functional area may be reduced to be less than or equal to the storage capacitance of the normal pixels in the normal area. As such, the pixel driving ability of the display panel or that of the electronic device may be improved. In addition, the electronic device or the display panels may have good display quality. Moreover, through adjusting the thickness of the insulation layer, the electronic device or the display panel may ensure that the distance between the functional pixel electrodes and the functional common electrodes of the functional pixels is greater than the distance between the normal pixel electrodes and the normal common electrodes of the normal pixels. Hence, the storage capacitance of the functional pixels in the functional area may be controlled. Besides, the electronic device or the display panel may control the overlap ratio by applying the IPS technology and the FFS technology, whereby the storage capacitance of the functional pixels may be reduced to be less than or equal to the storage capacitance of the normal pixels. Additionally, the electronic device or the display panel may adjust the second overlap ratio by making the functional pixel electrodes to overlap or not overlap the functional common electrodes. As such, the electronic device or the display panel may strike a balance between reducing the storage capacitance of the functional pixels or maintaining the effective storage capacitance. In another aspect, there may be a width difference between the overlapping area of the functional pixel electrodes and the functional common electrodes, which may lessen the impact of the deviation or tolerance generated in the manufacturing process on the overlap ratio of the functional pixel electrodes and the functional common electrodes. Thereby, the electronic device or the display panel may ensure the overlap ratio of the functional pixel electrodes and the functional common electrodes to be kept as expected. As a result, the pixel driving ability of the electronic device or the display panel may be improved, and the electronic device or the display panel may have good display quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel, comprising:
a normal area, comprising a plurality of normal pixels, each of the normal pixels having a normal pixel electrode and a normal common electrode, wherein the normal pixel electrode and the normal common electrode are configured in a manner that each of the normal pixels has a first overlap ratio; and
a functional area, comprising a plurality of functional pixels, each of the functional pixels having a functional pixel electrode and a functional common electrode, wherein the functional pixel electrode and the functional common electrode are configured in a manner that each of the functional pixels has a second overlap ratio;
wherein the second overlap ratio of at least a part of the functional pixels is less than the first overlap ratio of at least a part of the normal pixels,
wherein a thickness of a second insulation layer disposed on the functional common electrodes in the functional area is greater than a thickness of a first insulation layer disposed on the normal common electrodes in the normal area.

2. The display panel according to claim 1, wherein the functional pixel electrodes and the functional common electrodes are located in different layers.

3. The display panel according to claim 2, wherein the functional pixel electrodes partially overlap the functional common electrodes.

4. The display panel according to claim 2, wherein the functional pixel electrodes are disposed on the functional common electrodes, and the second insulation layer is sandwiched between the functional pixel electrodes and the functional common electrodes.

5. The display panel according to claim 2, wherein the functional common electrodes are disposed on the functional pixel electrodes, and the second insulation layer is sandwiched between the functional pixel electrodes and the functional common electrodes.

6. The display panel according to claim 1, wherein the functional pixel electrodes and the functional common electrodes are located in a same layer.

7. The display panel according to claim 6, wherein the normal pixel electrodes and the normal common electrodes are located in different layers.

8. The display panel according to claim 7, wherein the normal pixel electrodes are disposed on the normal common electrodes, and the first insulation layer is sandwiched between the normal pixel electrodes and the normal common electrodes.

9. The display panel according to claim 7, wherein the normal common electrodes are disposed on the normal pixel electrodes, and the first insulation layer is sandwiched between the normal pixel electrodes and the normal common electrodes.

10. A display panel, comprising:
a normal area, comprising a plurality of normal pixels, each of the normal pixels having a normal pixel electrode and a normal common electrode, wherein the normal pixel electrode and the normal common electrode are configured in a manner that each of the normal pixels has a first overlap ratio; and
a functional area, comprising a plurality of functional pixels, each of the functional pixels having a functional pixel electrode and a functional common electrode, wherein the functional pixel electrode and the functional common electrode are configured in a manner that each of the functional pixels has a second overlap ratio;
wherein the second overlap ratio of at least a part of the functional pixels is less than the first overlap ratio of at least a part of the normal pixels,
wherein a vertical distance between the functional pixel electrodes and the functional common electrodes is greater than a distance between the normal pixel electrodes and the normal common electrodes.

11. The display panel according to claim 1, wherein the first overlap ratio is a ratio of an overlapping area of the normal pixel electrodes and the normal common electrodes to an area occupied by the normal common electrodes.

12. The display panel according to claim 1, wherein the second overlap ratio is a ratio of an overlapping area of the functional pixel electrodes and the functional common electrodes to an area occupied by the functional common electrodes.

13. The display panel according to claim 1, wherein in a normal direction of the display panel, an area occupied by any of the functional pixels is larger than an area occupied by any of the normal pixels.

14. The display panel according to claim 13, wherein the second overlap ratio is, in a direction perpendicular to the normal direction, a ratio of an overlapping area of the functional pixel electrodes and the functional common electrodes to an area occupied by the functional common electrodes in the normal direction.

15. The display panel according to claim 13, wherein the functional pixel electrodes and the functional common electrodes are located in different layers, the functional pixel electrodes have first finger portions, the functional common electrodes have second finger portions, and in the normal direction of the display panel, the first finger portions of the functional pixel electrodes do not overlap the second finger portions of the functional common electrodes.

16. The display panel according to claim 15, wherein the functional pixel electrodes further have first connection portions connected to the first finger portions, the functional common electrodes further have second connection portions connected to the second finger portions, and the first connection portions overlap the second connection portions in the normal direction, wherein a second width of the second connection portions is greater than a first width of the first connection portions.

17. The display panel according to claim 1, wherein a first storage capacitance exists between the normal common electrodes and the normal pixels in the normal area, a second storage capacitance exists between the functional common electrodes and the functional pixels in the functional area, and the second storage capacitance is less than or equal to the first storage capacitance.

18. An electronic device, comprising:
- a display panel, comprising:
    - a normal area, comprising a plurality of normal pixels, each of the normal pixels having a normal pixel electrode and a normal common electrode, wherein the normal pixel electrode and the normal common electrode are configured in a manner that each of the normal pixels has a first overlap ratio; and
    - a functional area, comprising a plurality of functional pixels, each of the functional pixels having a functional pixel electrode and a functional common electrode, wherein the functional pixel electrode and the functional common electrode are configured in a manner that each of the functional pixels has a second overlap ratio,
    - wherein the second overlap ratio of at least a part of the functional pixels is less than the first overlap ratio of at least a part of the normal pixels, wherein a thickness of a second insulation layer disposed on the functional common electrodes in the functional area is greater than a thickness of a first insulation layer disposed on the normal common electrodes in the normal area; and
- an optical sensing module disposed corresponding to the functional area.

19. The electronic device according to claim 18, wherein the optical sensing module comprises an optical camera or an infrared sensor.

* * * * *